United States Patent
Svihla et al.

(10) Patent No.: US 9,181,855 B2
(45) Date of Patent: Nov. 10, 2015

(54) TURBOCHARGER WITH AXIAL TURBINE STAGE

(71) Applicant: Electro-Motive Diesel, Inc., LaGrange, IL (US)

(72) Inventors: Gary Robert Svihla, Burr Ridge, IL (US); Joshua Schueler, New Lenox, IL (US); Shakeel Nasir, Willowbrook, IL (US); Keith Moravec, Downers Grove, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 183 days.

(21) Appl. No.: 13/755,687

(22) Filed: Jan. 31, 2013

(65) Prior Publication Data

US 2014/0208741 A1     Jul. 31, 2014

(51) Int. Cl.
*F02B 33/44* (2006.01)
*F02B 37/00* (2006.01)
*F04D 29/54* (2006.01)
*F01D 9/04* (2006.01)
*F02C 6/12* (2006.01)

(52) U.S. Cl.
CPC ............... *F02B 37/00* (2013.01); *F01D 9/041* (2013.01); *F02C 6/12* (2013.01); *Y02T 10/144* (2013.01)

(58) Field of Classification Search
CPC .......... F02B 37/00; F02B 37/04; F02B 37/22; F02B 37/18; F01D 17/165; F01D 9/041; F05B 2220/40; Y02T 10/144; F02C 6/12
USPC ......... 60/602, 605.1; 417/380, 379, 405–407, 417/409, 391; 415/202, 205, 230
See application file for complete search history.

(56) References Cited

U.S. PATENT DOCUMENTS 2,492,672 A * 12/1949 Wood .............................. 417/372
2,684,196 A * 7/1954 Wood ................................ 417/83
(Continued)

FOREIGN PATENT DOCUMENTS

JP        61-210223       9/1986

OTHER PUBLICATIONS

Kech et al., Exhaust Gas Recirculation: Internal engine technology for reducing nitrogen oxide emissions. available at http://www.mtu-online.com/fileadmin/fm-dam/mtu-global/technical-info/white-papers/MTU_White_Paper_Exhaust_Gas_Recirculation.pdf, 4 pages, Aug. 2011.

*Primary Examiner* — Thai Ba Trieu
*Assistant Examiner* — Jason T Newton
(74) *Attorney, Agent, or Firm* — Finnegan, Henderson, Farabow, Garrett & Dunner, LLP

(57) ABSTRACT

A turbocharger is disclosed for use with an engine. The turbocharger may include a housing at least partially defining a compressor shroud and a turbine shroud. The turbine shroud may form a volute having an inlet configured to receive exhaust from an exhaust manifold of the engine in a tangential direction. The volute may also include an axial channel disposed downstream of the inlet. The turbocharger may also include a turbine wheel disposed within the turbine shroud that may be configured to receive exhaust from the axial channel. The turbocharger may also include a compressor wheel disposed within the compressor shroud, and a shaft connecting the turbine wheel to the compressor wheel. The turbocharger may also include a nozzle ring disposed within the axial channel at a location upstream of the turbine wheel.

18 Claims, 4 Drawing Sheets

(56) References Cited

U.S. PATENT DOCUMENTS

| | | | |
|---|---|---|---|
| 2,709,567 A * | 5/1955 | Wood | 415/115 |
| 2,722,101 A * | 11/1955 | Wosika | 60/726 |
| 2,881,972 A * | 4/1959 | Feilden | 417/369 |
| 3,257,797 A | 6/1966 | Lieberherr | |
| 3,303,994 A * | 2/1967 | Morooka | 417/369 |
| 3,667,214 A * | 6/1972 | Addie | 60/608 |
| 3,824,034 A * | 7/1974 | Leicht | 415/209.2 |
| 3,936,241 A * | 2/1976 | Einbeck | 417/407 |
| 4,149,832 A * | 4/1979 | Sivolap et al. | 417/409 |
| 4,184,812 A * | 1/1980 | Nomura et al. | 417/407 |
| 4,367,626 A * | 1/1983 | Schwartzman | 60/606 |
| 4,534,700 A * | 8/1985 | Horler et al. | 415/135 |
| 4,894,990 A * | 1/1990 | Tsubouchi | 60/602 |
| 5,109,674 A | 5/1992 | Sudmanns | |
| 5,758,500 A * | 6/1998 | Sumser et al. | 60/602 |
| 5,803,719 A | 9/1998 | Ramsden et al. | |
| 6,287,091 B1 * | 9/2001 | Svihla et al. | 417/407 |
| 7,908,860 B2 | 3/2011 | Trombetta et al. | |
| 7,931,437 B1 * | 4/2011 | Johnson | 415/184 |
| 7,984,615 B2 | 7/2011 | Woodcock et al. | |
| 8,234,864 B2 | 8/2012 | Easley, Jr. et al. | |
| 8,281,588 B2 | 10/2012 | Garrett et al. | |
| 8,739,528 B2 * | 6/2014 | Shiraishi | 60/605.3 |
| 2004/0241015 A1 * | 12/2004 | Loos | 417/407 |
| 2008/0219842 A1 * | 9/2008 | Hilakari et al. | 415/208.2 |
| 2008/0295516 A1 * | 12/2008 | Teshima et al. | 60/624 |
| 2009/0158733 A1 * | 6/2009 | Swenson et al. | 60/605.1 |
| 2011/0252790 A1 * | 10/2011 | Lotterman et al. | 60/605.1 |
| 2011/0252792 A1 | 10/2011 | Kares et al. | |
| 2011/0296828 A1 | 12/2011 | An et al. | |
| 2013/0052054 A1 * | 2/2013 | Loringer et al. | 417/406 |
| 2013/0219885 A1 * | 8/2013 | Watson et al. | 60/605.1 |
| 2014/0219836 A1 * | 8/2014 | Houst et al. | 417/406 |

* cited by examiner

TURBOCHARGER WITH AXIAL TURBINE STAGE

TECHNICAL FIELD

The present disclosure is directed to a turbocharger and, more particularly, to turbocharger with an axial turbine stage.

BACKGROUND

A turbocharged air induction system includes a turbocharger that compresses air flowing into the engine, thereby forcing more air into an associated combustion chamber. The increased supply of air allows for increased fueling, which may result in increased power. A turbocharged engine typically produces more power than the same engine without turbocharging.

An exemplary turbocharger is described in U.S. Patent Publication No. 2011/0252790 to Lotterman et al. that published on Oct. 20, 2011. The '790 publication describes a turbocharger having an axial turbine with a spiraling volute passageway. The axial turbine receives a circumferential exhaust gas stream that drives a turbine wheel around an axis of rotation. The spiraling passageway accelerates the speed of the gas stream to supersonic speeds. The exhaust gas stream may have both an axial component and a circumferential component, and is ultimately released from the turbine in an axial direction.

Although the turbocharger of Lotterman et al, may provide accelerated airflow through the turbine, it may still be less than optimal. In particular, the turbocharger of Lotterman et al. directs a non-uniform and poorly guided axial flow through the turbine wheel for wide operating conditions. This poorly guided non-uniform flow may create high energy losses, reduced aerodynamic efficiencies, and increased mechanical or vibrational stresses (or strains) on the turbine during operation due to flow misalignment (high incidence) with the blades of the turbine at wide operating conditions. Also, the axial turbine stage shown in Lotterman et al. is a high reaction stage, which may lead to supersonic flows with higher aerodynamic losses (passage and secondary flows) in blade passages, as compared to low reaction stages at similar turbine stage loading conditions.

The disclosed turbocharger is directed to overcoming one or more of the problems set forth above and/or other problems of the prior art.

SUMMARY

In one aspect, the present disclosure is directed to a turbocharger for use with an engine. The turbocharger may include a housing at least partially defining a compressor shroud and a turbine shroud. The turbine shroud may form a volute having an inlet configured to receive exhaust from an exhaust manifold of the engine in a tangential direction. The volute may also include an axial channel disposed downstream of the inlet. The turbocharger may also include a turbine wheel disposed within the turbine shroud that may be configured to receive exhaust from the axial channel. The turbocharger may also include a compressor wheel disposed within the compressor shroud, and a shaft connecting the turbine wheel to the compressor wheel. The turbocharger may also include a nozzle ring disposed within the axial channel at a location upstream of the turbine wheel.

In another aspect, the present disclosure is directed to a method of handling exhaust from an engine. The method may include receiving exhaust from an exhaust manifold of the engine at a volute inlet of a turbine in a tangential direction, and directing exhaust from the volute inlet through an axial channel. The method may also include directing exhaust from the axial channel through a nozzle ring, and directing exhaust from the nozzle ring through a turbine wheel to drive a compressor wheel connected to the turbine wheel by a shaft.

DETAILED DESCRIPTION

Figure 1:
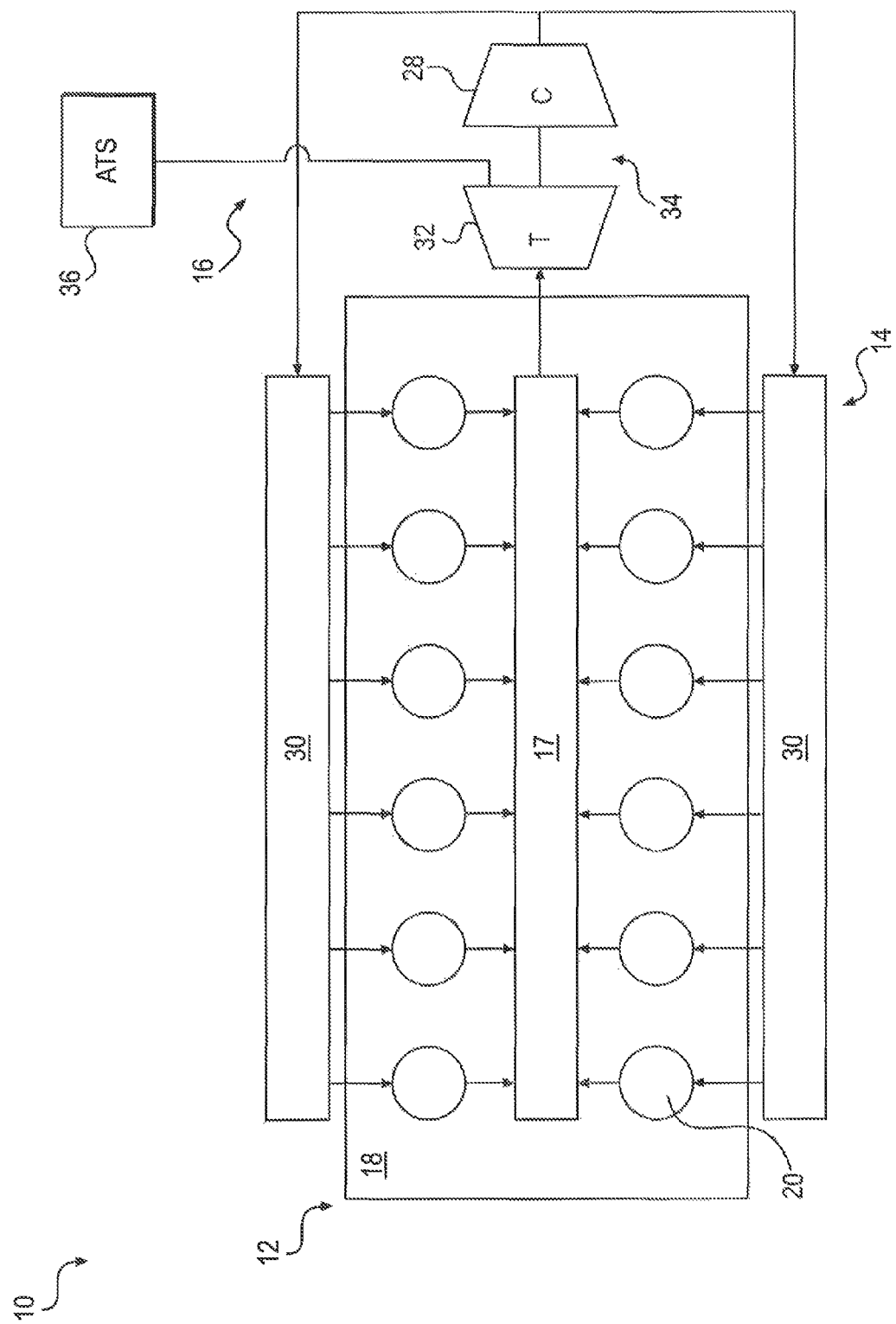
FIG. 1 is an isometric illustration of an exemplary disclosed power system.

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a two or four-stroke gasoline or gaseous fuel-powered engine. Air induction system 14 may be configured to direct air or a mixture of air, fuel, and exhaust (such as in an EGR driven system) into power source 12 for combustion. Exhaust system 16 may be configured to direct combustion exhaust from power source 12 to the atmosphere.

Power source 12 may include an engine block 18 that at least partially defines a plurality of cylinders 20. A piston (not shown) may be slidably disposed within each cylinder to reciprocate between a top-dead-center position and a bottom-dead-center position, and a cylinder head (not shown) may be associated with each cylinder 20. Each cylinder 20, piston, and cylinder head may together at least partially define a combustion chamber. In the illustrated embodiment, power source 12 includes twelve cylinders 20 arranged in a V-configuration (i.e., a configuration having first and second banks or rows of cylinders 20). However, it is contemplated that power source 12 may include a greater or lesser number of cylinders 20 and that cylinders 20 may be arranged in an inline configuration, in an opposing-piston configuration, or in another configuration, if desired.

Air induction system 14 may include, among other things, at least one compressor 28 that may embody a fixed geometry compressor, a variable geometry compressor, or any other type of compressor configured to receive air and compress the air to a desired pressure level. Compressor 28 may direct air to one or more intake manifolds 30 associated with power source 12. It should be noted that air induction system 14 may include multiple compressors 28 arranged in a serial configuration, a parallel configuration, or combination serial/parallel configuration, as desired.

Exhaust system 16 may include, among other things, an exhaust manifold 17 connected to one or both of the banks of cylinders 20. Exhaust system 16 may also include at least one turbine 32 driven by the exhaust from exhaust manifold 17 to rotate the compressor(s) of air induction system 14. It should be noted that compressor 28 and turbine 32 may together form a turbocharger 34. Turbine 32 may embody a fixed geometry turbine, a variable geometry turbine, or any other type of turbine configured to receive exhaust and convert potential energy in the exhaust to a mechanical rotation. After exiting turbine 32, the exhaust may be discharged to the atmosphere through an aftertreatment system 36 that may include, for example, a hydrocarbon closer, a diesel oxidation catalyst (DOC), a diesel particulate filter (DPF), and/or any other treatment device known in the art, if desired. It should be noted that exhaust system 16 may include multiple turbines 32 arranged in a serial configuration, a parallel configuration, or combination serial/parallel configuration.

Figure 2:
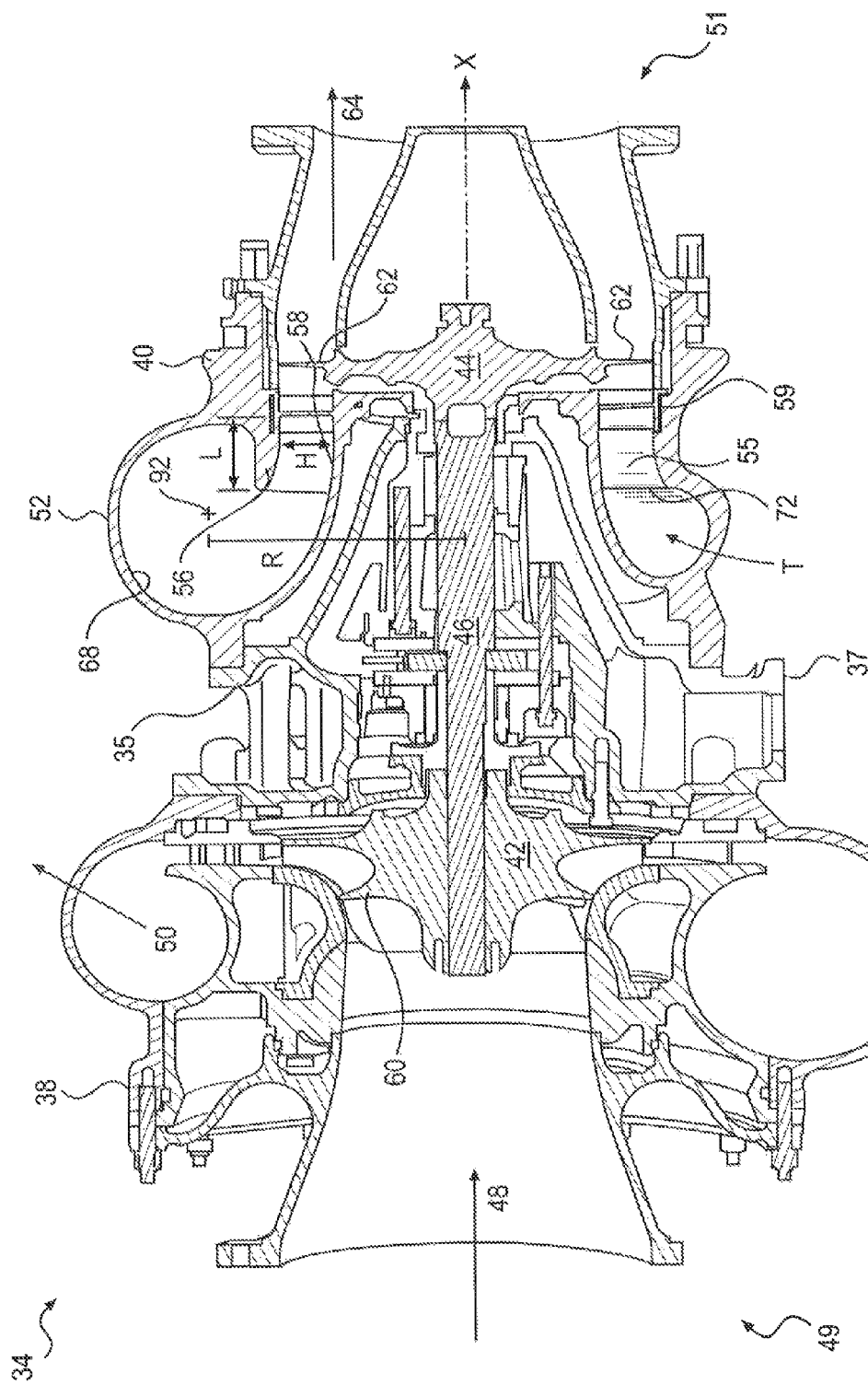
FIG. 2 is a cross-sectional illustration of an exemplary disclosed turbocharger that may be used in conjunction with the power system of FIG. 1.

As illustrated in FIG. 2, turbocharger 34 may include a center housing 35 at least partially defining compressor and turbine shrouds 38, 40 configured to house corresponding compressor and turbine wheels 42, 44 that are connected to each other via a common shaft 46. Compressor shroud 38 may include an axially-oriented inlet 48 located at a first axial end 49 of turbocharger 34, and a tangentially-oriented outlet volute 50 located between first axial end 49 and a second axial end 51 of turbocharger 34. Turbine shroud 40 may include a volute 52 located between outlet volute 50 and second axial end 51 of turbocharger 34. Turbine shroud 40 may be configured to receive exhaust flow in a tangential direction T at a volute inlet 54 (shown only in FIG. 3). Volute 52 may direct the exhaust flow in three directions—tangential (around a rotation axis X), radial (along a radius of the volute), and axial (along rotation axis X)—toward and through an axial channel 55. Axial channel 55 may be disposed between an annular tongue 56 and a coaxial inner annular surface 58. A nozzle ring 59 may be disposed within axial channel 55 and be configured to accelerate exhaust gas flowing through axial channel 55.

For purposes of this disclosure, a height H of axial channel 55 may refer to a radial distance between annular tongue 56 and inner annular surface 58. A tongue length may refer to a distance between an end of tongue 56 and nozzle ring 59 along rotation axis X. A tongue-to-height ratio TR may be defined as the ratio of tongue length L to height H (TR=L/H). In the disclosed embodiment, TR may be about 0.8 to 1.6.

As compressor wheel 42 is rotated, air may be drawn axially in to turbocharger 34 via inlet 48, toward a center of compressor wheel 42. Blades 60 of compressor wheel 42 may then push the air tangentially outward, via outlet volute 50, in a spiraling fashion into an air induction manifold of power system 10 (referring to FIG. 1). Similarly, as exhaust from exhaust system 16 is directed tangentially, radially, and axially inward toward turbine wheel 44, the exhaust may push against blades 62 of turbine wheel 44, causing turbine wheel 44 to rotate and drive compressor wheel 42 via shaft 46. After passing through turbine wheel 44, the exhaust may exit axially outward through a turbine outlet 64 located at second axial end 51 of turbocharger 34 into the atmosphere via aftertreatment system 36 (shown only in FIG. 1). Compressor and turbine wheels 42, 44 may embody conventional wheels, with any number and configuration of blades 60, 62 radially disposed on corresponding wheel bases.

Figure 3:
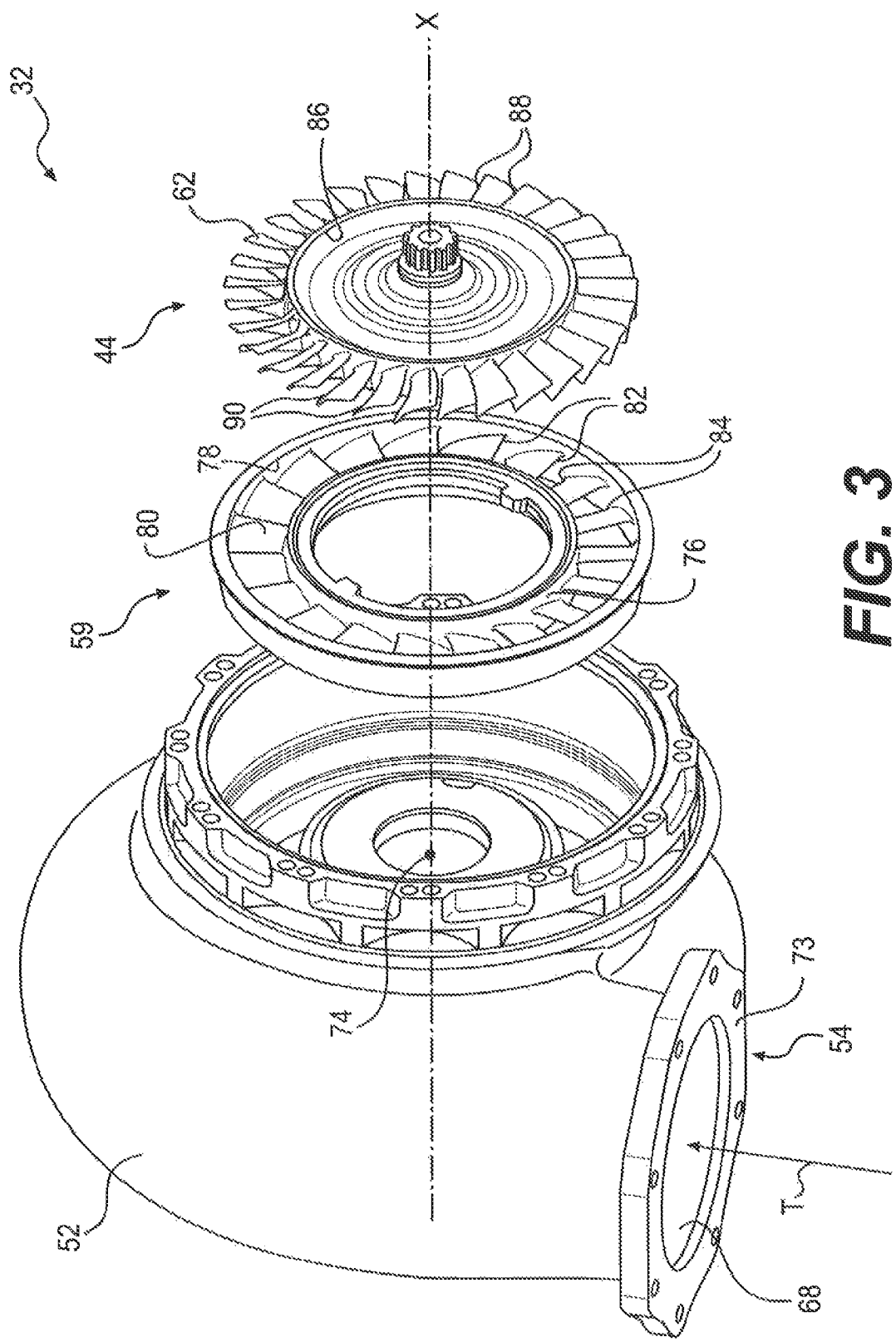
FIG. 3 is an exploded view of an exemplary turbine that may be used in conjunction with the turbocharger of FIG. 2.

Referring to FIGS. 2 and 3, volute 52 may have a generally spiral shape and an interior surface 68. A diameter of interior surface 68 may be larger than a diameter of annular tongue 56 at most portions of volute 52. The difference in the diameters of interior surface 68 and annular tongue 56 may be greatest at locations closest to volute inlet 54, and gradually decrease so as to converge to about zero as interior surface 68 winds inward tangentially with respect to rotation axis X. Annular tongue 56 and interior surface 68 may converge at a curved transition portion 72. Volute 52 may have distinct cross-sectional areas A and corresponding radii R (referring to FIG. 2) at different azimuth angles about the turbine wheel centerline (rotation axis X). An area-to-radius ratio $(A/R)_i$ may be about 100-140 mm at an inlet flange 73 (shown only in FIG. 3) of the volute 52. The area-to-radius ratio (A/R) may expand to $(A/R)_0$ (about 110-150 mm) at a position corresponding to a 0 degree azimuth angle. The position corresponding to the 0 degree azimuth angle may represent a plane that is parallel to a face of inlet flange 73, and also intersects a center 74 of volute 52 that is disposed along rotation axis X. The area-to-radius ratio (A/R) may decrease linearly as the azimuth angle is increased about rotation axis X. That is, the area-to-radius ratio (A/R) may decrease as volute 52 winds tangentially inward about rotation axis X until a final $(A/R)_{360}$ (about 10-40 mm) is reached at a position corresponding to a 360 degree azimuth angle that substantially converges with the 0 degree azimuth angle. The control of the area-to-radius ratio (A/R) may allow for a uniform flow into nozzle ring 59. Additionally, volute 52 may ingest purely tangential flow, and convert it to a flow additionally having axial and radial components, but maintain an about 45-75 degree tangential component through axial channel 55 upstream of nozzle ring 59.

Referring to FIG. 3, volute 52, nozzle ring 59, and turbine wheel 44 may be located coaxially along rotation axis X. Volute 52 and nozzle ring 59 may be stationary, while turbine wheel 44 may rotate with respect to rotation axis X. Nozzle ring 59 may be generally ring-shaped and may include an inner annular hub 76 and an outer annular flange 78. A plurality of three-dimensional vanes 80 may be disposed between annular hub 76 and outer annular flange 78 to direct and accelerate exhaust flow from volute 52 toward blades 62 of turbine wheel 44. Each vane 80 may include a trailing edge 82 located close to turbine wheel 44, and a leading edge 84 located away from turbine wheel 44. Turbine wheel 44 may be generally disc-shaped and include an annular hub 86. Blades 62 may extend outward in three dimensions from annular hub 86. Each blade 62 may have a trailing edge 88 that is close to turbine outlet 64, and a leading edge 90 that is away from turbine outlet 64.

Figure 4:
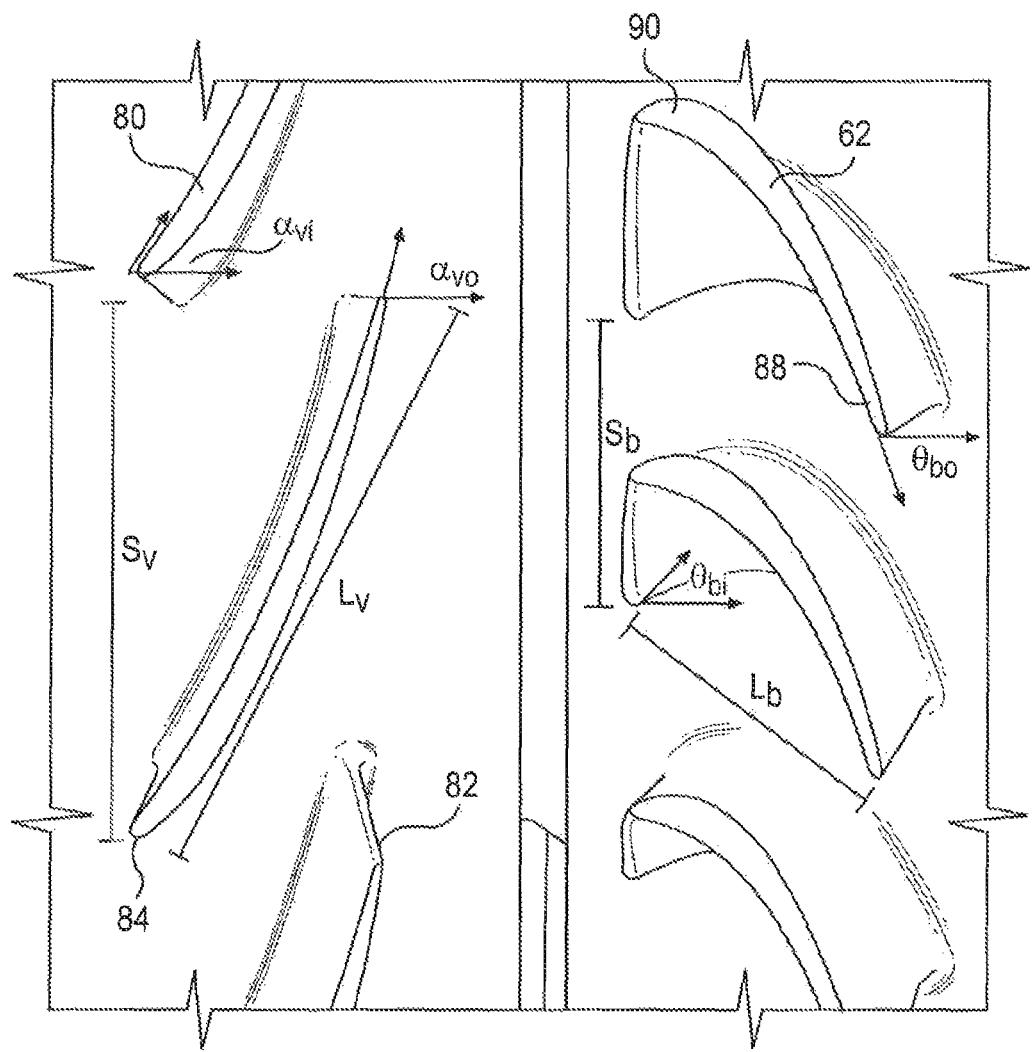
FIG. 4 is a pictorial illustration of exemplary disclosed vanes and blades that may be used in conjunction with the turbine of FIG. 3.

As shown in FIG. 4, vane chord length $L_v$ may refer to a straight line distance between trailing and leading edges 82, 84 at any radial location. A vane spacing $S_v$ may refer to a straight line distance between adjacent trailing edges 82 of vanes 80 (e.g., a spacing of vanes 80 may refer to a straight line distance between trailing edges 82 of adjacent vanes 80) at any radial location. A vane solidity ratio $SR_v$ may be defined as a ratio of the chord length $L_v$ to the spacing $S_v$ ($SR_v=L_v/S_v$) at any radial location. A blade chord length $L_b$ may refer to a straight line distance between trailing and leading edges 88, 90 at any radial location. A blade spacing $S_b$ may refer to a straight line distance between adjacent trailing edges 88 of blades 62 (e.g., a spacing of blades 62 may refer to a straight line distance between trailing edges 88 of adjacent blades 62) at any radial location. A blade solidity ratio $SR_b$ may be defined as a ratio of the chord length $L_b$ to the spacing $S_b$ ($SR_b=L_b/S_b$) at any radial location. Vane inlet and outlet angles $\alpha v_i, \alpha v_o$ may refer to angles between tangents to a camber line of vane 80 at leading and trailing edges 84, 82, and a turbine axial direction. The vane turning angle $\Delta\alpha$ may be defined as a difference between inlet vane angle $\alpha v_i$ and outlet vane angle $\alpha v_o$ ($\Delta\alpha=\alpha v_i-\alpha v_o$). The angle of vanes 80 with respect to the axial direction may increase from leading edge 84 toward trailing edge 82. Blade inlet and outlet angles $\theta b_i, \theta b_o$ may refer to angles between tangents to a camber line of blades 62 at leading and trailing edges 90, 88, and the turbine axial direction. The blade turning angle $\Delta\theta$ may be defined as a difference between inlet blade angle $\theta b_i$ and outlet blade angle $\theta b_o$ ($\Delta\theta=\theta b_i-\theta b_o$).

The disclosed geometries of nozzle ring 59 and turbine wheel 44 (including vanes 80 and blades 62) have been selected to take advantage of the tangential flow and flow uniformity exiting volute 50. For example, because of the significant tangential flow entering nozzle ring 59, vanes 80 and blades 62 may be designed to have a low solidity ratio. In this arrangement, $SR_v$ may be about 0.9 to 1.35 at a vane midspan, while $SR_b$ may be about 1.1 to 1.5 at a blade midspan. A maximum vane turning angle $|\Delta\alpha|$ may be about 60 degrees at annular hub 76, while a maximum blade turning angle $|\Delta\theta|$ may be about 135 degrees at annular hub 86. That is, vane turning angle $|\Delta\alpha|$ may be equal to or lesser than about 60 degrees at annular hub 76, while blade turning angle $|\Delta\theta|$ may be equal to or lesser than about 135 degrees at annular hub 86. In this arrangement, nozzle ring 59 may have a hub-to-flange ratio (i.e., ratio of inner annular hub 76 to outer annular flange 78) of about 0.55-0.77. Similarly, turbine wheel 44 may have a hub-to-tip ratio (i.e., ratio of annular hub 86 to an outer end of blades 62) of about 0.55-0.77. Referring to FIGS. 2 and 4, a centroid 92 of volute 52 may be radially and axially off-center from leading edge 84 of vane 80. This off-centering of the centroid 92 may provide enough space to improve burst-containment features of turbine shroud 40.

A degree of reaction of a turbine stage may be defined as the ratio of energy transfer by the change in static head to the total energy transfer in turbine wheel 44. A turbine stage of turbine 32 may have a degree of reaction of about 0.5 at the design point (peak performance) operating condition.

INDUSTRIAL APPLICABILITY

The disclosed turbocharger may be implemented into any power system application where charged air induction is utilized. Specifically, use of volute 52 to provide a uniform tangential flow through nozzle ring 59 may result in overall lower aerodynamic losses and, thus, improved performance and efficiency of turbine 32. The uniform and well guided flow exiting volute 52 and nozzle ring 59 may result in more uniform loading of nozzle ring 59 and turbine wheel 44 at wide operating conditions. This may help to reduce cyclic loading on turbine wheel 44, extending the useful life of turbine wheel 44 at wide operating conditions. Because exhaust flow may be substantially uniform and well guided as to each blade 62, mechanical and vibrational losses attributable to misaligned exhaust flow and turbine blade geometry may be significantly reduced. The tangential flow exiting volute 52 and work split up by nozzle ring 59 and turbine wheel 44 may improve turbine stage reaction, and lead to lower aerodynamic losses (such as passage, supersonic, and secondary flows) in blade passages as compared to higher reaction stages at similar turbine stage loading conditions. To accommodate the significant tangential flow within axial channel 55, nozzle ring 59 and turbine wheel 44 may have low solidity and, thus, fewer vanes and blades. The reduction in vanes and blades may equate to a reduction in material costs. Further, as exhaust flow enters volute 50 between axial ends of turbocharger 34, the thrust loads of compressor 28 and turbine 32 may oppose each other. As a result, the net force may be reduced on thrust bearings of the turbocharger, reducing mechanical losses.

It will be apparent to those skilled in the art that various modifications and variations can be made to the disclosed turbocharger. Other embodiments will be apparent to those skilled in the art from consideration of the specification and practice of the disclosed turbocharger. It is intended that the specification and examples be considered as exemplary only, with a true scope being indicated by the following claims and their equivalents.

What is claimed is:

1. A turbocharger for an engine, comprising:
   a housing at least partially defining a compressor shroud and a turbine shroud, the turbine shroud forming a volute having:
   an inlet configured to receive exhaust from an exhaust manifold of the engine in a tangential direction; and
   an axial channel disposed downstream of the inlet;
   a turbine wheel disposed within the turbine shroud and configured to receive exhaust from the axial channel;
   a compressor wheel disposed within the compressor shroud;
   a shaft connecting the turbine wheel to the compressor wheel;
   a nozzle ring disposed within the axial channel at a location upstream of the turbine wheel;
   an inner annular surface; and
   a tongue disposed coaxially outward of the inner annular surface;
   wherein the axial channel is formed between the inner annular surface and the tongue; and
   wherein a geometry of the volute is based in part on a ratio of a length of the tongue to a height of the axial channel;
   wherein:
   the ratio of the length of the tongue to the height of the axial channel is about 0.8 to 1.6;
   the ratio is greatest at an inlet of the volute; and
   the ratio converges to about zero as the interior surface winds tangentially inward.

2. The turbocharger of claim 1, wherein:
   the compressor shroud further includes an net located at a first axial end of the turbocharger;
   the turbine shroud further includes an outlet located at a second axial end of the turbocharger; and
   the net of the volute is located between the first and second axial ends of the turbocharger.

3. The turbocharger of claim 2, wherein the compressor shroud further includes an outlet volute located between the net of the compressor shroud and the inlet of the volute.

4. The turbocharger of claim 1, wherein the nozzle ring further includes:
   an inner annular hub;
   an outer annular flange; and
   a plurality of vanes disposed between the inner annular hub and the outer annular flange.

5. The turbocharger of claim 4, wherein each of the plurality of vanes includes:
   a leading edge;
   a vane inlet angle defined by a tangent to a camber line of the vane at the leading edge and an axial direction of the turbocharger;
   a trailing edge;
   a vane outlet angle defined by a tangent to a camber line of the vane at the trailing edge and an axial direction of the turbocharger; and
   a vane turning angle defined by a difference between the vane inlet angle and the vane outlet angle, wherein the vane turning angle is equal to or lesser than 60 degrees.

6. The turbocharger of claim 4, wherein a ratio of an inner annular hub radius to an outer annular flange radius is about 0.55 to 0.77.

7. The turbocharger of claim 4, wherein a solidity ratio of the plurality of vanes is about 0.90 to 1.35 at vane midspan.

8. The turbocharger of claim 1, wherein the turbine wheel further includes:
an annular hub; and
a plurality of blades extending outward in from the annular hub.

9. The turbocharger of claim 8, wherein each of the plurality of blades includes:
a leading edge;
a blade inlet angle defined by a tangent to a camber line of the blade at the leading edge and an axial direction of the turbocharger;
a trailing edge;
a blade outlet angle defined by a tangent to a camber line of the vane at the trailing edge and an axial direction of the turbocharger; and
a blade turning angle defined by a difference between the blade inlet angle and the blade outlet angle, wherein the blade turning angle is equal to or lesser than 135 degrees.

10. The turbocharger of claim 8, wherein a solidity ratio of the plurality of blades is about 1.1 to 1.5 at blade midspan.

11. The turbocharger of claim 8, wherein a ratio of an annular hub radius to a distance from a center of the turbine wheel to an outer end of the plurality of blades is about 0.55 to 0.77.

12. The turbocharger of claim 1, wherein a centroid of the volute is radially and axially off-center from a vane of the nozzle ring.

13. The turbocharger of claim 1, wherein:
the inlet of the volute further includes an inlet flange; and
a ratio between a cross-sectional area of the volute and a radius of the volute at the inlet flange is about 100-140 mm.

14. The turbocharger of claim 13, wherein:
the ratio between the cross-sectional area of the volute and the radius of the volute at a 0 azimuth angle is about 110-150 mm;
the ratio between the cross-sectional area of the volute and the radius of the volute at a 360 azimuth angle is about 10-40 mm; and
the 0 azimuth angle is located at a position corresponding to a plane that is parallel to a face of the inlet flange that also intersects a center of the volute disposed on a rotation axis of the volute.

15. A method of handling exhaust from an engine, the method comprising:
receiving exhaust from an exhaust manifold of the engine at a volute inlet of a turbine in a tangential direction;
directing exhaust from the volute inlet through an axial channel;
directing exhaust from the axial channel through a nozzle ring; and
directing exhaust from the nozzle ring through a turbine wheel to drive a compressor wheel connected to the turbine wheel by a shaft;
wherein the volute is formed in part based on a ratio of a length of a tongue of the volute, disposed coaxially outward of an inner annular surface of the volute, to a height of an axial channel of the volute; and
wherein:
the ratio of the length of the tongue to the height of the axial channel is about 0.8 to 1.6;
the ratio is greatest at an inlet of the volute; and
the ratio converges to about zero as the interior surface winds tangentially inward.

16. The method of claim 15, further including directing exhaust through an axial outlet disposed at a first axial end of the turbine, wherein the volute has a 45-75 degree tangential component through the axial channel upstream of the nozzle ring.

17. The method of claim 16, wherein exhaust is received at the volute inlet at a location between the first axial end of the turbine and an axial end of a compressor.

18. A power system, comprising:
an engine;
an exhaust manifold fluidly connected to the engine;
a turbocharger fluidly connected to the exhaust manifold, the turbocharger including:
a housing at least partially defining a compressor shroud and a turbine shroud, the turbine shroud forming a volute having:
an inlet configured to receive exhaust from the exhaust manifold in a tangential direction; and
an axial channel disposed downstream of the inlet;
a turbine wheel disposed within the turbine shroud and configured to receive exhaust from the axial channel;
a compressor wheel disposed within the compressor shroud;
a shaft connecting the turbine wheel to the compressor wheel;
a nozzle ring disposed within the axial channel at a location upstream of the turbine wheel;
an inner annular surface; and
a tongue disposed coaxially outward of the inner annular surface;
wherein the axial channel is formed between the inner annular surface and the tongue;
wherein a geometry of the volute is based in part on a ratio of a length of the tongue to a height of the axial channel; and
wherein:
the ratio of the length of the tongue to the height of the axial channel is about 0.8 to 1.6;
the ratio is greatest at an inlet of the volute; and
the ratio converges to about zero as the interior surface winds tangentially inward.

* * * * *